United States Patent Office 2,890,195
Patented June 9, 1959

2,890,195
COMPOSITIONS COMPRISING A DIEPOXIDE AND A POLYHYDRIC COMPOUND

Benjamin Phillips and Paul S. Starcher, Charleston, and Charles W. McGary, Jr., and Charles T. Patrick, Jr., South Charleston, W. Va., assignors to Union Carbide Corporation, a corporation of New York No Drawing. Application April 4, 1957
Serial No. 650,554

9 Claims. (Cl. 260—45.4)

This invention relates to novel, polymerizable, curable compositions; to polymerized cured compositions prepared therefrom and to methods of making the same. More particularly, this invention is directed to novel, polymerizable, curable epoxy-containing compositions and has for an object the provision of novel epoxy-containing compositions useful in the arts of molding, coatings, laminating adhesives, castings and the like.

The curable compositions of this invention are low viscosity liquids at temperatures ranging upwards from room temperatures. Numerous advantages and objects can be attained by employment of the compositions of this invention. For example, these compositions are compatible with a wide variety of fillers and pigments which may be employed therein, if desired, to adjust the composition viscosity and at the same time enhance the physical properties of resins formed therefrom. These compositions can be easily handled in such resin-forming applications as coating, bonding, laminating, molding casting, potting and the like, without the need of solvents or diluents although such solvents or diluents can be used, if desired. In casting applications, these compositions can be made to fill small intracacies of molds without applying high pressures or heating to high temperatures. In coating applications, they can be easily spread, brushed, or sprayed on surfaces by the many techniques available to the paint, lacquer and varnish industries. These curable compositions undergo negligible shrinkage when cured and are particularly useful in bonding, casting, molding and potting wherein undue shrinkage is particularly undesirable. These compositions can be easily prepared using low temperatures at which no gelation occurs during preparation. However, they can be cured or polymerized rapidly at higher temperatures. The pot lives of these compositions can be controlled, as desired. These compositions can be made with relatively short pot lives, of the order of a few minutes, with relatively long pot lives, of the order of several hours or of several days, or with pot lives of intermediate duration, as desired.

The cured resins are transparent and water-resistant. They can be made as hard, rigid, infusible products, as tough, flexible, infusible products or as products having intermediate degrees of hardness and rigidity or toughness and flexibility, as desired. These resins can be machined to desired shapes and configurations and can be polished to provide appealing finishes. They can be made as infusible products which are resistant to most organic solvents. These resins can also be made as products having high heat distortion values, and are capable of sustaining heavy loads at high temperatures. In accordance with this invention, resins having combinations of any one or several of these useful properties can be produced.

The novel compositions of the present invention are directed to polymerizable, curable compositions containing epoxides characterized by the general formula:

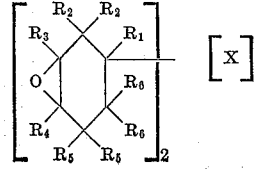

wherein X represents divalent radicals selected from the group consisting of

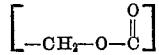

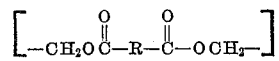

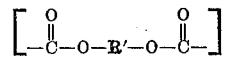

wherein R represents members selected from the group consisting of aliphatic and aromatic hydrocarbon groups containing from 2 through 12 carbon atoms, R' represents members selected from the group consisting of lower aliphatic hydrocarbon groups and lower oxyalkylene groups, and $R_1$ through $R_6$ represent hydrogen or lower alkyl groups.

In the broadest embodiment, this invention is directed to curable compositions containing epoxides, characterized by the general formula above, and containing a polyol. A preferred class of compositions of this invention as directed to polymerizable, curable compositions containing (a) a 3,4-epoxycyclohexylmethyl 3,4-epoxycyclohexanecarboxylate, and (b) a polyol in an amount having from 0.2–1.5 hydroxyl equivalents per epoxy equivalent.

A more preferred class of compositions to which this invention is directed are polymerizable, curable compositions comprising (a) a 3,4-epoxycyclohexylmethyl 3,4-epoxycyclohexanecarboxylate, and (b) a phenol in an amount having from 0.2–1.5 hydroxyl per epoxy equivalent.

A particularly preferred group of compositions of this invention are directed to polymerizeable, curable, compositions comprising (a) a 3,4-epoxycyclohexylmethyl 3,4-epoxycyclohexanecarboxylate, and (b) a polyhydric phenol in an amount having from 0.5–0.9 hydroxyl equivalents per epoxy equivalent.

An important modification of the broadest embodiment of the invention is directed to the polymerizable, curable, compositions comprising (a) epoxides characterized by the general formula:

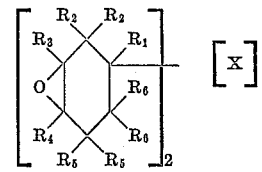

wherein X represents divalent radicals selected from the group consisting of

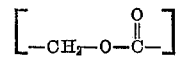

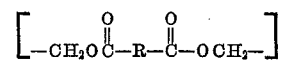

and

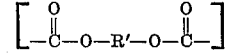

wherein R represents members selected from the group consisting of aliphatic and aromatic hydrocarbon groups containing from 2 through 12 carbon atoms, R' represents members selected from the group consisting of lower aliphatic hydrocarbon groups and lower oxyalkylene groups, and $R_1$ through $R_6$ represent hydrogen or lower alkyl groups; (b) a polyol in an amount having z hydroxyl equivalents per epoxy equivalent of said epoxide; and (c) a polycarboxylic compound in an amount having w carboxyl equivalents per epoxy equivalent of said epoxide, wherein w is a number in the range of from 0.0–0.5; z is a number in the range of from 0.2–1.5; the sum of w plus z is not greater than 1.5 and w/z is less than 1.0.

A preferred novel sub-class of this important modification of the broadest embodiment of the invention is directed to the polymerizable, curable, compositions comprising (a) a 3,4-epoxycyclohexylmethyl 3,4-epoxycyclohexanecarboxylate; (b) a polyol in an amount having z hydroxyl equivalents per epoxy equivalent of said epoxide; and (c) a polycarboxylic compound in an amount having w carboxyl equivalents per epoxy equivalent of said epoxide, wherein z is a number in the range of from 0.2 to 1.5; w is a number in the range of from 0.0 to 0.5; the sum of z plus w is not greater than 1.5 and w/z is less than 1.0.

A more preferred novel sub-class of this important modification of the broadest embodiment of the invention is directed to polymerizable, curable compositions comprising (a) a 3,4-epoxycyclohexylmethyl 3,4-epoxycyclohexanecarboxylate; (b) a polyhydric phenol in an amount having z hydroxyl equivalents per epoxy equivalent of said epoxide; and (c) a polycarboxylic compound in an amount having w carboxyl equivalents per epoxy equivalent of said epoxide, wherein z is a number in the range of from 0.2 to 1.5; w is a number in the range of from 0.0 to 0.5; the sum of w plus z is not greater than 1.5 and w/z is less than 1.0.

A particularly preferred novel sub-class of this important modification of the broadest embodiment of the invention is directed to polymerizable, curable compositions comprising (a) a 3,4-epoxycyclohexylmethyl 3,4-epoxycyclohexanecarboxylate; (b) a polyhydric phenol in an amount having z hydroxyl equivalents per epoxy equivalent of said epoxide; and (c) a polycarboxylic compound in an amount having w carboxyl equivalents per epoxy equivalent of said epoxide, wherein z is a number in the range of from 0.5 to 0.9; w is a number in the range of from 0.0 to 0.5; the sum of w plus z is not greater than 0.9 and w/z is less than 1.0.

The compositions of this invention can be prepared by mixing the diepoxides described above with a polyol. In preparing homogeneous compositions, it is advantageous to employ a temperature as high as the melting point of the component of the mixture which has the highest melting point. Stirring of the components also aids in the formation of homogeneous compositions.

Acidic and basic catalyst can be added, if desired, to accelerate the rate of curing or polymerization. Catalysts in amounts ranging up to 5.0 weight percent based on the weight of the diepoxide can be added at this point; at any time prior to curing or not at all, as desired. Higher catalyst concentrations above this range are also effective, although concentrations of 5.0 weight percent and below have been found to be adequate. Catalyst concentrations of 0.001 to 5.0 weight percent based on the weight of the diepoxide are particularly preferred. This composition then can be cooled to room temperature and stored for future use, if desired, or used immediately. Other polyfunctional materials also may be incorporated into the curable compositions. Such polyfunctional materials include other polyepoxides, e.g., polyglycidyl ethers of polyhydric phenols and the like, low molecular weight urea-formaldehyde or phenol-formaldehyde polymers and the like. Many variations in the physical properties of the resin compositions can be obtained by employing such other polyfunctional materials in the curable compositions of this invention.

Curing can be carried out by maintaining the curable compositions at temperatures from about 25° C. to 250° C. Temperatures higher than 250° C. can be used, although some discoloration, which may not be desired in the final product, may result. The time for effecting a complete cure can be varied from several minutes to several hours. While not wishing to be held to any particular theory or mechanics of reaction, it is believed that during the polymerization or curing reaction the polyol reacts with the diepoxide, in the case of 3,4-epoxy-6-methylcyclohexylmethyl 3,4-epoxy-6-methylcyclohexanecarboxylate and a polyhydric phenol, as follows:

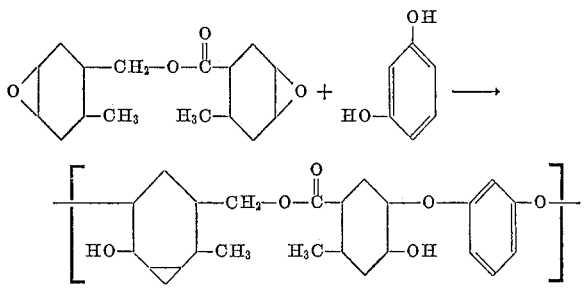

Theoretically the diepoxides are difunctional with polyols but, practically, other competing reactions can occur thereby reducing the amount of polyol necessary to produce useful compositions. While it has not been established, and while not wishing to be bound by any particular theory or explanation, the fact that the ratio of 0.60–0.75 mol of polyol to 1.0 mol of 3,4-epoxy-6-methylcyclohexylmethyl 3,4-epoxycyclohexanecarboxylate can probably be explained by the observation that some etherification of the diepoxide occurs which cross-links the resin to some extent.

The compositions of this invention have been described above in terms of epoxy equivalents, hydroxyl equivalents and, in some cases, carboxyl equivalents. By the term "epoxy equivalent" as used herein, is meant the number of epoxy groups

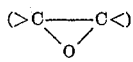

contained by a mol of the epoxides described above. For example, one mol of 3,4-epoxy-6-methylcyclohexylmethyl 3,4-epoxy-6-methylcyclohexanecarboxylate contains two epoxy equivalents. The term "carboxyl equivalent," as employed herein, is intended to mean the number of carboxyl group (—COOH) contained by a mol of a polycarboxylic compound. For example, the "carboxyl equivalent" of a dicarboxylic acid is two. In the case of a dicarboxylic acid anhydride, the term "carboxyl equivalent" is meant to indicate the number of carboxyl groups which would be contained by a mol of the corresponding dicarboxylic acid. Thus, for example, one mol of a dicarboxylic acid anhydride would have a "carboxyl equivalent" of two.

The term "hydroxyl equivalent," as used herein, is intended to mean the number of hydroxyl groups (—OH) contained in a mol of polyol. Thus, for example, one mol of glycerol contains 3-hydroxyl equivalents since it contains 3-hydroxyl groups.

Thus, in expressing the novel compositions of this invention resort has been made to certain letters of the alphabet which are used to express the relative proportions of the components of the systems, that is, polyol and/or polyol and polycarboxylic compound, which provide useful compositions in accordance with the purposes and objects of this invention. Thus, the letter, z, is used to signify the number of hydroxyl equivalents (—OH) per equivalent of epoxide and the letter, w, is used to signify the number of carboxyl equivalents (—COOH) per epoxide equivalent. As hereinbefore described, the useful compositions are obtained by employing equivalent proportions of from 0.2 to 1.5 equivalents of hydroxyl groups per epoxy group. Therefore z will represent the number of hydroxyl equivalents in the range of from 0.2 to 1.5. When it is desired to modify the diepoxide-polyol composition with an amount of polycarboxylic compound, useful compositions are obtained by incorporating into said compositions from 0.0 to 1.0 carboxyl equivalent of the polycarboxylic compound per epoxy equivalent of the diepoxide, w, therefore, will be a number in the range of from 0.0 to 1.0 carboxyl equivalents per epoxy equivalent. The sum of $z$ plus $w$ is not greater than 1.5 and the ratio of $w/z$ is less than 1, since the polyol is always the major component of the composition with respect to the polycarboxylic compound.

The term "polyol" as used herein, is meant an organic compound having at least two hydroxyl groups which are alcoholic hydroxyl groups, phenolic hydroxyl groups or both alcoholic and phenolic hydroxyl groups. Typical polyols can be represented by the general formula:

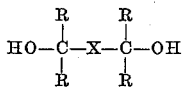

R is an alkyl group or hydrogen and can be the same or different for all R's in the molecule. X can be a single bond or a divalent group composed of a carbon atom or group of carbon atoms interconnected by single or multiple bonds and to which such groups as hydrogen, alkyl hydroxyl, cyclic groups and the like or combinations thereof can be attached. X can also represent such divalent groups as oxyalkylene or polyoxyalkylene groups. X, as a divalent group may also contain a carbon atom group which contains sulfur. It can also represent cyclic groups, such as phenylene, cyclohexylene and the like. The R's and X together with the carbon atoms, i.e., the C's of the formula, can represent a cyclic group such as phenylene, cyclohexylene and the like. The presence of other groups, with the exception of tautomeric enolic groups, not specifically listed herein and not participating in the curing reaction is by no means harmful and, in fact, can be useful in developing special properties in our resins. Mixtures of polyols or only one polyol can be employed in our curable compositions.

Representative polyols which can be employed in the compositions are polyhydric alcohols, such as, ethylene glycol, diethylene glycol, polyethylene glycols, propylene glycol, tripropeylene glycol, polypropylene glycols, polyethylenepolypropylene glycols, trimethylene glycol, butanediols, pentanediols, 2-ethyl-1,3-hexanediol, 2-methyl-2,4-pentanediol, 12,13-tetracosanediol, 2-butine-1,4-diol, 2-methoxymethyl-2,4-dimethyl-1,5-pentanediol, diethanolamine, triethanolamine, glycerol polyglycerols, pentaerythritol, sorbitol, polyvinyl alcohols, cyclohexanediols, cyclopentanediols, inositol, trimethylolphenol, and polyhydric phenols, such as dihydroxytoluenes, resorcinol, bis(4-hydroxyphenyl)-2,2-propane, bis(4-hydroxyphenyl)methane, the polyhydric phenolic-formaldehyde condensation products, and the like. Polyols which are free of actylenic unsaturation and composed of carbon, hydrogen and oxygen combined as hydroxyl oxygen or ether oxygen connecting two otherwise unconnected carbon atoms and having not more than 24 carbon atoms are preferred.

By the term "polycarboxylic compound," as used herein, is meant polycarboxylic anhydrides, polycarboxylic acids and polycarboxylic acid-esters and can be aliphatic, aromatic or cycloaliphatic in nature. Polycarboxylic acid anhydrides useful in preparing the compositions of this invention can be characterized by the formula:

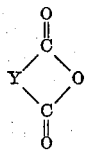

wherein Y represents two or more carbon atoms interconnected by single or double bonds and to which such groups as hydrogen, alkyl, hydroxyl, nitro, chloro, iodo, bromo, cyclic groups and the like or combinations thereof may be attached. Y can also represent groups containing carbon atoms interconnected by single or double bonds and oxydicarboxyl groups

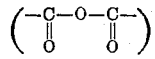

interconnecting the carbon atom groups to which such other groups as previously mentioned can be attached. Y may also represent such cyclic groups as phenylene, cyclohexylene, cyclohexenylene, and the like which may have one or more oxydicarbonyl groups attached thereto. Polycarboxylic acid anhydrides, containing other groups mentioned herein, and not taking part in the curing or polymerization reaction can be used in our curable compositions without harmful effects, and, in fact, can be used to develop particular properties in our resins. One polycarboxylic acid anhydride or a mixture of two or more, as desired, can be used in our curable compositions. Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride, hexachloroendomethylenetetrahydrophthalic anhydride, hereinafter referred to as chlorendic anhydride, tetrabromophthalic anhydride, tetraiodophthalic anhydride, phthalic anhydride, 4-nitrophthalic anhydride, 1,2-naphthalic anhydride, 1,8-naphthalic anhydride, 2,3-naphthalic anhydride, 1,2,4,5-benzenetetracarboxylic dianhydride, polymeric dicarboxylic acid anhydrides, or mixed polymeric dicarboxylic acid anhydrides such as those prepared by the autocondensation of dicarboxylic acids, for example, adipic acid, isophthalic acid, and the like. Also, other dicarboxylic acid anhydrides, useful in our curable compositions include the Diels-Alder adducts of maleic acid and aliphatic compounds having conjugated double bonds. Preferred polycarboxylic acid anhydrides are those which are soluble in the diepoxide at temperatures below about 250° C.

The polycarboxylic acids which can be employed if desired as modifying ingredients in the novel compositions of this invention include aliphatic, aromatic and cycloaliphatic dicarboxylic acids such as, for example, oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutaonic acid, muconic acid, ethylidenemalonic acid, isopropylidenemalonic acid, allylmalonic acid, 1,2-cyclohexanadicarboxylic acid, 1,4-cyclohexanedicarboxylic acid, 2-carboxy-2-methylcyclohexaneacetic, phthalic acid, isophthalic acid, terephthalic acid, 1,8-naphthalenedicarboxylic acid, 3-carboxycinnamic acid, 1,2-naphthalene dicarboxylic acid, tetrahydrophthalic acid, and tetrachlorophthalic acid. Preferred aliphatic dicarboxylic acids include aliphatic dibasic acids containing from five through ten carbon atoms. Other suitable polycarboxylic acid compounds include tricarboxylic acids such as, 1,1,5-pentanetricarboxylic acid, 1,2,4-hexane-tricarboxylic acid, 2-propyl-1, 2,4-pentanetricarboxylic acid, 5-octene-3,3,6-tricarboxylic acid, 1,2,3-propanetricarboxylic acid, 1,2,4-benzenetricarboxylic acid and the like. Mixtures of polycarboxylic acids can be employed if desirable. Other suitable polycarboxylic acid compounds include acid-esters or polycarboxy polyesters containing carboxylic acid end groups prepared by the reaction of a polycarboxylic acid or a polycarboxylic acid anhydride and a polyhydric alcohol. Typical polyhydric alcohols which can be reacted with any of the above-mentioned polycarboxylic acids or polycarboxylic acid anhydrides to provide polycarboxy polyesters containing carboxylic acid end groups suitable for use in preparing the novel compositions of this invention include ethylene glycol, diethylene glycol, triethylene glycol, tetraethylene glycol, 1,2-propylene glycol, 1,3-propylene glycol, dipropylene glycol, tripropylene glycol, 1,2-butylene glycol, 1,4-butanediol, 1,5-pentanediol, 2,4-pentanediol, 2,2-dimethyl-1,3-propanediol, 1,5-hexanediol, 2,5-hexanediol, 1,6-hexanediol; 3 - methyl - 1,5-pentanediol, 2-methyl-2,5 - pentanediol, 3-methyl - 2,5-pentanediol, 1,4-hexanediol, 2,2 - diethyl - 1,3-propanediol, 2-methoxymethyl - 2,4 - dimethyl-1,5 - pentanediol, 2-ethoxymethyl-2,4 - dimethyl - 1,5 - pentanediol, 2-ethyl-1,3-hexanediol, 2,5 - dimethyl - 2,5 - hexanediol, 1,12 - octadecanediol, glycerol, 1,2,6 - hexanetriol, 1,1,1 - trimethylol propane, trimethylol methane, pentaerythritol, dipentaerythritol, diglycerol, pentaglycerol, sorbitol, manitol, polyvinyl alcohol of varying molecular weights and the like.

Preferred polycarboxy polyesters containing carboxyl end groups are those prepared from the dicarboxylic acids or dicarboxylic acid anhydrides enumerated above the dihydric, trihydric and tetrahydric alcohols.

The ratios, in which the dicarboxylic acid or dicarboxylic acid anhydride can be reacted with polyhydric alcohols of the type referred to above, are limited to those which provide carboxyl end groups. Thus, the dicarboxylic acid or dicarboxylic acid anhydride must be reacted with the polyhydric alcohol in greater than equivalent amounts and care must be taken, in the case of tri and tetrafunctional reactants, that gelation does not occur due to the formation of cross-linked polyesters. It has been discovered that suitable polyesters can be prepared provided the mole ratio ranges prescribed in the accompanying Table I are observed:

TABLE I

| Alcohol | Mole Ratio of Acid or Anhydride/Alcohol | |
| --- | --- | --- |
| | Usable | Preferred |
| trihydric | 2.2 to 3.0 | 2.5 to 3.0 |
| tetrahydric | 3.3 to 4.0 | 3.5 to 4.0 |

The diepoxides hereinbefore described which are suitable for use in preparing the novel compositions of this invention include the 3,4-epoxycyclohexylmethyl 3,4 - epoxycyclohexanecarboxylates; the aliphatic diol bis(3,4-epoxycyclohexanecarboxylates); and the bis(3,4 - epoxycyclohexylmethyl) dicarboxylates.

The 3,4-epoxycyclohexylmethyl 3,4-epoxycyclohexanecarboxylates referred to above can be conveniently characterized by the following general formula:

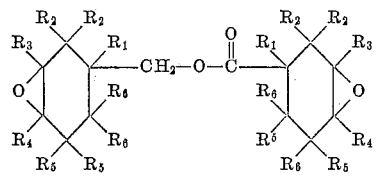

wherein $R_1$, $R_2$, $R_3$, $R_4$, $R_5$ and $R_6$ represent a hydrogen atom or an aliphatic hydrocarbon radical, and include 3,4 - epoxycyclohexylmethyl 3,4 - epoxycyclohexanecarboxylate; 3,4 - epoxy - 1 - methylcyclohexylmethyl 3,4-epoxy - 1 - methylcyclohexanecarboxylate; 3,4 - epoxy-2-methylcyclohexylmethyl 3,4 - epoxy - 2 methylcyclohexanecarboxylate; 3,4 - epoxy - 6 - methylcyclohexylmethyl 3,4 - epoxy - 6-methylcyclohexanecarboxylate; 3,4-epoxy-3 - methylcyclohexylmethyl 3,4 - epoxy - 3 - methylcyclohexanecarboxylate; 3,4 - epoxy-4-methylcyclohexylmethyl 3,4 - epoxy - 4-methylcyclohexanecarboxylate; 3,4-epoxy-5 - methylcyclohexylmethyl 3,4 - epoxy - 5 - methylcyclohexanecarboxylate; and a lower alkyl substituted 3,4-epoxycyclohexylmethyl 3,4-epoxycyclohexanecarboxylate.

The aliphatic diol bis(3,4-epoxycyclohexanecarboxylates) include the dihydric alcohol diesters of acids selected from the group consisting of 3,4-epoxycyclohexanecarboxylic acid and lower alkyl substituted 3,4-epoxycyclohexanecarboxylic acids in which the hydroxyl groups of said dihydric alcohols are esterified by said acids and wherein said dihydric alcohol represents members selected from the group consisting of lower aliphatic hydrocarbon glycols and polyalkylene glycols corresponding to the general formula:

wherein X represents members selected from the group consisting of hydrogen and methyl groups and n represents a positive integer in the range of from 2 through 3. Typical aliphatic diol bis(3,4-epoxycyclohexanecarboxylates) include ethylene glycol bis(3,4-epoxycyclohexanecarboxylate); 2-ethyl-1,3-hexanediol bis(3,4-epoxycyclohexanecarboxylate); 3-methyl-1,5-pentanediol bis(3,4-epoxycyclohexanecarboxylate); 1,5-pentanediol bis(3,4-epoxycyclohexanecarboxylate) and 1,6-hexanediol bis(3,4 - epoxycyclohexanecarboxylate).

The bis(3,4-epoxycyclohexylmethyl) dicarboxylates include the hydrocarbon dicarboxylic acid diesters of alcohols selected from the group consisting of 3,4-epoxycyclohexylmethanol and lower alkyl substituted 3,4-epoxycyclohexylmethanols in which the carboxyl groups of said dicarboxylic acid are esterified by said alcohols and wherein the dicarboxylic acid contains from 2 through 12 carbon atoms. Typical bis(3,4-epoxycyclohexylmethyl)-dicarboxylates include bis(3,4 - epoxycyclohexylmethyl) maleate; bis(3,4-epoxycyclohexylmethyl) pimelate; bis-(3,4 - epoxy - 6 - methylcyclohexylmethyl) maleate; bis-(3,4-epoxy-6-methylcyclohexylmethyl) succinate; and bis-(3,4-epoxycyclohexylmethyl) terephthalate.

The process of the invention is carried out, generally, by heating to a temperature of about 25° C. to 250° C., a mixture comprising a 3,4-epoxycyclohexylmethyl 3,4-cyclohexanecarboxylate and a polyol, modified or unmodified by the addition of a polycarboxylic compound. The preferred minimum temperature is that temperature at which the particular reaction mixture forms a homogeneous mass. Thus, compositions of epoxides and polyols and low melting anhydrides, e.g., maleic anhydride, temperatures of at least 30° C. are preferred, while compositions of epoxides and polyols with higher-melting anhydrides, such as phthalic anhydride, temperatures of about 100° C. to 110° C. are required. The temperature required for gelation within reasonable times is a temperature in the range of from 100° C. to 180° C. The heating times for gelation to occur generally vary from five minutes to five hours. This gelation time, however, can be significantly reduced by the use of various catalysts to accelerate the reaction. Typical catalysts include both acids and bases, such as sulfuric acid, stannic chloride, perchloric acid, pyridine, aniline, benzyldimethylamine, benzyltrimethylammonium hydroxide and dilute sodium hydroxide. Preferably, these catalysts are employed in an amount in the range of from 0.001 to 5.0 percent based on the weight of the diepoxide.

The curing of the gelated product may be allowed to proceed at the selected geling temperature or, if desired, a more rapid cure can be had by raising the temperature as high as 250° C. It has been found that the time required for the formation of a hard, transparent and insoluble resin generally varies from five to ten minutes up to two to six hours, depending on whether a catalyst is used, the amount of the catalyst present and the temperature employed.

Catalysts which can be employed with advantageous effects in accelerating the cure of the compositions of the present invention are the basic and acidic catalysts including strong alkalis, mineral acids and metal halide Lewis acids. Typical strong alkalis include the alkali metal hydroxides, e.g., sodium hydroxide and potassium hydroxide, and quaternary ammonium compounds, e.g., benzoyltrimethylammonium hydroxide, tetramethylammonium hydroxide and the like. Representative of mineral acids which can be used in speeding the formation of our resins are sulfuric acid, perchloric acid, polyphosphoric acid and the various sulfonic acids, such as toluene sulfonic acid, benzene sulfonic acid and alkane sulfonic acids, e.g., ethyl sulfonic acid and the like. Metal halide Lewis acids which are also effective in speeding the cure of our resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoride-monoethylamine complexes. In the form of a complex, the metal halide Lewis acid cataylst is believed to remain substantially inactive until released as by dissociation of the complex upon increasing the temperature. When released from the complex, the catalyst then exerts its catalytic effect.

Uniform dispersion of catalyst in the compositions prior to curing has been found to be desirable in order to obtain homogeneous resins and to minimize localized curing around catalyst particles. Agitation of the compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methyl-isobutyl-ketone, cyclohexanone, organic alcohols, e.g., methanol, cyclohexanol, propylene glycol and the like. The mineral acids and strong alkalis can be employed as solutions in water, whereas metal halide Lewis acid catalysts tend to decompose in water and aqueous solutions of such Lewis acids are not preferred.

It has been found that a catalyst can be advantageously employed to effect curing where the polyol is a straight-chain polyol. When an aromatic polyol or an aromatically-substituted polyol is employed, no catalyst is necessary.

The following examples will serve to illustrate the practice of the invention. Barcol hardness values were determined at room temperature with a Barcol Impressor GYZJ 934–1. Heat distortion values and Izod impact values were determined in accordance with ASTM methods D–648–45T and D–256–47T, respectively.

*Example 1.—Reaction of 3,4-epoxy-6-methylcyclohexylmethyl 3,4-epoxy-6-methylcyclohexanecarboxylate with resorcinol*

A mixture was prepared containing 3,4-epoxy-6-methylcyclohexylmethyl 3,4-epoxy-6-methylcyclohexanecarboxylate and resorcinol in the molar proportions of 0.75 to 1.0. The mixture was heated until it formed a uniform melt and was cured for a period of 10 hours at a temperature of 170° C. After this period, a tough, amber-colored resin having a Barcol hardness of 40 was obtained.

*Example 2.—Reaction of 3,4-epoxy-6-methylcyclohexylmethyl 3,4-epoxy-6-methylcyclohexanecarboxylate and diphenylolpropane*

Three mixtures were prepared comprising diphenylolpropane and 3,4-epoxy-6-methylcyclohexylmethyl 3,4-epoxy-6-methylcyclohexanecarboxylate containing the proportions of phenol and epoxide as shown in the accompanying table. These mixtures were heated until a uniform, homogeneous melt was obtained. Thereupon, these mixtures were poured into bar molds and cured for a period of 20 hours at a temperature of 180° C. The resins provided were hard, tough and amber in color and characterized by the physical properties as shown in Table II:

TABLE II

REACTION OF 3,4-EPOXY-6-METHYLCYCLOHEXYL-METHYL 3,4-EPOXY-6-METHYLCYCLOHEXANECARBOXYLATE AND DIPHENYLOLPROPANE

| Mol Ratio, Phenol/Epoxide | Heat Distortion, 264 p.s.i., ° C. | Izod Impact |
|---|---|---|
| 0.6 | 125 | 0.22 |
| 0.75 | 110 | 0.31 |
| 0.9 | 101 | 0.14 |

*Example 3.—Effect of the variation in the molar ratio of resorcinol and 3,4-epoxy-6-methylcyclohexylmethyl 3,4-epoxy-6-methylcyclohexanecarboxylate*

The molar ratio of resorcinol was varied over a wide range in order to determine which molar ratio of polyhydroxyl compound to epoxide would provide useful compositions. The resorcinol and 3,4-epoxy-6-methylcyclohexylmethyl 3,4 - epoxy-6-methylcyclohexanecarboxylate mixtures were heated until a uniform melt was obtained and were cured until they were hard and tough or until the had been baked for a period of 21 hours at 160° C. The following Table III illustrates the results obtained:

TABLE III

| Mol Ratio, Phenol/Epoxide | Characteristics of Resin |
|---|---|
| 0.1 | liquid. |
| 0.2 | soft. |
| 0.3 | hard. |
| 0.6 | hard, tough. |
| 0.75 | Do. |
| 1.0 | Do. |
| 1.25 | hard, brittle. |
| 1.5 | hard, brittle, weak, opaque. |
| 2.0 | hard, brittle, weak. |

*Example 4.—Effect of catalyst in the reaction of resorcinol and 3,4 - epoxy - 6 - methylcyclohexylmethyl 3,4-epoxy-6-methylcyclohexanecarboxylate*

Six mixtures were prepared containing resorcinol and 3,4-epoxy-6-methylcyclohexylmethyl 3,4-epoxy-6-methylcyclohexanecarboxylate in the mol ratio of 1 to 1. Various amounts of catalysts were added to these mixtures, whereupon the mixtures were heated to 130° C. The time required for the formation of a soft gel was recorded as a measure of the activity of the catalyst. The results listed in Table IV show the effect of various catalysts on the gel time of the mixture:

TABLE IV

| Catalyst | Catalyst Concentration, percent | Gel Time, Minutes |
|---|---|---|
| none | 0 | 240 |
| benzyldimethylamine | 5 | 30 |
| potassium hydroxide | 5 | 30 |
| perchloric acid [1] | 0.25 | 15 |
| sulfuric acid [2] | 1.25 | 10 |
| zinc chloride [3] | 2.1 | 5 |

[1] Applied as a 2D solution (acetic acid).
[2] Applied as a 10D solution (diethyl ether).
[3] Applied as a saturated solution (diethyl ether).

*Example 5.—Reaction of resorcinol and 3,4-epoxycyclohexylmethyl 3,4-epoxycyclohexanecarboxylate*

3,4 - epoxycyclohexylmethyl 3,4 - epoxycyclohexanecarboxylate and resorcinol were mixed in equimolar proportions and heated until homogeneous. The mixture was maintained at a temperature of 130° C. and gelled in about 3 hours. After curing for 16 hours at 130° C., a hard, tough resin was obtained.

*Example 6.—Reaction of resorcinol and 3,4-epoxy-3(or 4)-methylcyclohexylmethyl 3,4-epoxy-3(or 4)-methyl-cyclohexanecarboxylate*

A mixture was prepared containing 3,4-epoxy-3(or 4)-methylcyclohexylmethyl 3,4-epoxy-3(or 4)-methylcyclohexanecarboxylate and resorcinol in equimolar proportions and heated until homogeneous. Thereupon, the temperature was raised to 160° C. for a period of 16 hours and provided a resin which was soft at room temperature.

The above experiment was repeated using 0.05 percent of perchloric acid and 0.4 percent of zinc chloride as catalysts. These catalysts were applied as a 2 percent solution in acetic acid and an 8 percent solution in diethyl ether respectively. The resins obtained after curing for 16 hours at a temperature of 160° C. were hard at room temperature.

*Example 7.—Reaction of 3,4-epoxy-6-methylcyclohexylmethyl 3,4-epoxy-6-methylcyclohexanecarboxylate, diphenylolpropane and adipic acid.*

A mixture was prepared comprising 3,4-epoxy-6-methylcyclohexylmethyl 3,4 - epoxy - 6 - methylcyclohexanecarboxylate, diphenylolpropane and adipic acid in the molar proportions 1.0:0.5:0.5 respectively. The mixture was heated until homogeneous and cured for a period of 7 hours at a temperature of 130° C. A hard, tough, amber resin was obtained.

This example illustrates that the above system has the advantage of reacting faster than the 2-component system as shown in Example 2.

*Example 8.—Reaction of 3,4-epoxy-6-methylcyclohexylmethyl 3,4-epoxy-6-methylcyclohexanecarboxylate, diphenylolpropane and phthalic anhydride*

A mixture was prepared comprising 3,4-epoxy-6-methylcyclohexylmethyl 3,4 - epoxy - 6 - methylcyclohexanecarboxylate, diphenylolpropane and phthalic anhydride in the molar proportions of 1.0:0.5:0.75 respectively. The mixture was heated until homogeneous and cured for 7 hours at 130° C. A hard, tough, amber resin was obtained.

*Examples 9 through 10*

Various mixtures were prepared containing 1.4 grams of 3,4 - epoxy - 6 - methylcyclohexylmethyl 3,4 - epoxy - 6- methylcyclohexanecarboxylate and various amounts of various polyols and polycarboxylic compounds in the corresponding proportions listed in Table V. The resulting mixtures were heated until homogeneous and then maintained at 120° C.

The following Table VI reflects the properties of the resins prepared from the various examples:

TABLE VI

| No.: | Resin description |
|---|---|
| 9 | Brittle, hard. |
| 10 | Brittle, Barcol, 32. |

*Example 11.—Reaction of 3,4-epoxy-6-methylcyclohexylmethyl 3,4-epoxy-6-methylcyclohexanecarboxylate, diphenylolpropane and adipic acid.*

A mixture was prepared comprising 2.80 grams of 3,4-epoxy - 6 - methylcyclohexymethyl 3,4-epoxy-6-methylcyclohexanecarboxylate, 1.14 grams of diphenylolpropane and 0.37 gram of adipic acid, representing molar proportions of epoxide, polyol and polycarboxylic compound of 1.0:0.5:0.25, respectively. The resulting mixture was heated until homogeneous (about 110° C.) and the temperature maintained at 170° C. for a period of 7 hours. A gel was obtained after 10 minutes at 170° C. The product obtained was an amber-colored resin having a Barcol hardness at room temperature of 33.

*Example 12.—Reaction of bis(3,4-epoxycyclohexylmethyl) oxalate and resorcinol*

A mixture was prepared comprising 1.68 grams of bis(3,4-epoxycyclohexylmethyl) oxalate and 0.5 gram of resorcinol representing molar proportions of epoxide to polyol of 1.0:0.9, respectively. The resulting mixture was heated until homogeneous (about 100° C.), whereupon the temperature was raised to 160° C. and maintained for a period of 7 hours. A gel was obtained after 2 hours at a temperature of 160° C. There was obtained a hard, amber-colored resin.

*Examples 13 through 16*

Four compositions were prepared, each containing 2.8 grams of 3,4-epoxy-6-methylcyclohexylmethyl 3,4-epoxy-6-methylcyclohexanecarboxylate and various amounts of polyhydric phenols and polycarboxylic acids or anhydrides in the proportions indicated in the following Table VII. Each mixture was heated until homogeneous (about 100–110° C.) and the temperature evaluated to 120° C. for a period of about 3 hours, during which time gels were obtained. Each composition was post cured for 6 hours at a temperature of 160° C. and the physical properties of the resins obtained are indicated in Table VII.

TABLE V

| No. | Pololy | Grams per 1.4 grams of Epoxide | Acid | Grams per 1.4 grams of Epoxide | Epoxy Equiv./ Hydroxyl Equiv./Carboxyl Equiv. | Gel Time at 120° C. | Cure, Hrs. at ° C. |
|---|---|---|---|---|---|---|---|
| 9 | Resorcinol | 0.77 | maleic | 0.06 | 1/1.4/0.1 | 4.5 hrs | 11, 120; 6, 160. |
| 10 | diphenylol-propane. | 0.91 | glutaric | 0.46 | 1/0.8/0.7 | 15 min | 2.5, 120; 6, 160. |

TABLE VII

| No. | Polyol Hardener | Grams | Modifier | Grams | Epoxy Equiv./ Hydroxyl Equiv./ Carboxyl Equiv. | Gel. Time at 120° C., Min. | Resin Description |
|---|---|---|---|---|---|---|---|
| 13 | diphenylol-propane. | 3.42 | phthalic anhydride. | 1.48 | 1/1.5/1.0 | 35 | pale amber, hard. |
| 14 | do | 0.95 | maleic anhydride | 0.49 | 1/0.75/0.5 | Immediately | amber, Barcol, 45. |
| 15 | do | 1.82 | maleic acid | 0.23 | 1/0.8/0.2 | do | pale yellow, low, hard. |
| 16 | pyrogallol | 1.26 | 2-ethylbutenyl-succinic acid. | 1.01 | 1/1/0.5 | 3 | brown, hard. |

Example 17.—Effect of boron trifluoride-piperidine complex as a catalyst in the reaction of 3,4-epoxy-6-methylcyclohexylmethyl 3,4-epoxy-6-methylcyclohexanecarboxylate and diphenylolpropane A mixture was prepared comprising 1.4 grams of 3,4-epoxy-6-methylcyclohexylmethyl 3,4-epoxy-6-methylcyclohexanecarboxylate and 1.14 grams of diphenylolpropane in the proportions of 1.0 epoxide equivalent to 0.9 hydroxyl equivalent, respectively. The resulting mixture was heated until homogeneous (70–80° C.), whereupon the temperature was elevated to 120° C. for 17 hours until a gel was formed.

Another mixture was prepared containing 2.8 grams of 3,4-epoxy-6-methylcyclohexylmethyl 3,4-epoxy-6-methylcyclohexanecarboxylate and 0.05 gram of boron trifluoride-piperidine complex and heated until homogeneous (about 50° C.). The resulting mixture was then allowed to cool to room temperature, whereupon 2.28 grams of diphenylolpropane were added to the mixture. The mixture was then heated until homogeneous and the temperature maintained at 120° C. A gel time of 25 minutes at 120° C. was observed. Thus, it may be observed that the addition of a catalyst to an epoxide polyol composition considerably accelerates the rate of cure or polymerization.

Example 18.—Reaction of 3,4-epoxy-6-methylcyclohexylmethyl 3,4-epoxy-6-methylcyclohexanecarboxylate and trihydric phenols Compositions were prepared, each containing 5.6 grams of 3,4-epoxy-6-methylcyclohexylmethyl 3,4-epoxy-6-methylcyclohexanecarboxylate and 3.94 grams of the phenols listed in the following Table VIII, and heated until homogeneous (50–70° C.). The resulting mixtures were then maintained at a temperature of 160° C. for a perod of 13 hours. Gels were formed by the various mixture in a period of from 2 to 8 hours.

TABLE VIII

| Triphenol | Resin Description |
|---|---|
| 2-methyl-1,1,3-tris(hydroxyphenyl)propane | pale yellow, Barcol, 38. |
| 2-chloro-1,1,3-tris(hydroxyphenyl)propane | pale amber, Barcol, 45. |
| 1,1,3-tris(2-methylhydroxyphenyl) propane | amber, hard. |

Examples 19 through 22

Tabulated below are various examples of the resin compositions of the invention produced in accordance with the process of this invention. These compositions were prepared in a manner similar to the previous examples. Table IX reflects the variation of physical properties of the resins obtained by the addition of modifying amount of a polycarboxylic compound and/or a variation in the mol ratio of reactants.

TABLE IX

| No. | Epoxide | Grams | Phenol | Grams | Acid | Grams | Epoxy Equiv./ Hydroxyl Equiv./ Carboxyl Equiv. | Gel Time at 120° C., Hrs. | Cure, Hours at ° C. | Resin Description |
|---|---|---|---|---|---|---|---|---|---|---|
| 23 | (a) | 1.83 | Resorcinol | 0.77 | maleic | 0.06 | 1/1.4/0.1 | 17 | 33, 120; 6, 160. | dark amber, hard. |
| 24 | (a) | 1.83 | diphenylolpropane. | 0.91 | glutaric | 0.46 | 1/0.8/0.7 | 9 | 9.5, 120; 6, 160. | amber, tough. |
| 25 | (b) | 2.25 | resorcinol | 0.77 | maleic | 0.06 | 1/1.4/0.1 | 10 | 14, 120; 6, 160. | Do. |
| 26 | (b) | 2.25 | diphenylolpropane. | 0.91 | glutaric | 0.46 | 1/0.8/0.7 | 1.17 | 5.5, 120; 6, 160. | Do. | a 1,6-hexanediol bis(3,4-epoxycyclohexanecarboxylate).
b Bis(3,4-epoxy-6-methylcyclohexylmethyl) sebacate.

Example 23.—Reaction of 3,4-epoxy-6-methylcyclohexylmethyl 3,4-epoxy-6-methylcyclohexanecarboxylate and 1,2,6-hexanetriol Mixtures were prepared from 3,4-epoxy-6-methylcyclohexylmethyl 3,4-epoxy-6-methylcyclohexanecarboxylate and 1,2,6-hexanetriol in the proportions indicated in Table X. To each of these mixtures there was added a quantity of boron trifluoride-piperidine complex catalyst as indicated in Table X. Each mixture was heated to 120° C., poured into a bar mold and maintained at 120° C. for from 5 to 11 hours with gelation usually occurring in from 0.25 to 2.0 hours. After a post cure of 6 hours at 160° C. the resulting resins had the physical properties correspondingly listed in Table X.

TABLE X

| Diepoxide, grams | Triol, grams | Ratio of hydroxyl groups to epoxy groups | Catalyst concentration, percent [1] | Resin Properties | | |
|---|---|---|---|---|---|---|
| | | | | Heat distortion point, ° C. | Izod Impact | Barcol hardness |
| 31.0 | 4.0 | 0.4 | 3.5 | 111 | 0.2 | 40 |
| 30.2 | 4.8 | 0.5 | 1.5 | 142 | 0.2 | 46 |
| 30.2 | 4.8 | 0.5 | 2.5 | 122 | 0.2 | 46 |
| 30.2 | 4.8 | 0.5 | 3.6 | 129 | 0.2 | 47 |
| 27.9 | 7.1 | 0.8 | 3.9 | 94 | 0.3 | 40 |

[1] Calculated as weight percent boron trifluoride based on the weight of diepoxide.

Example 24.—Reaction of 3,4-epoxy-6-methylcyclohexylmethyl 3,4-epoxy-6-methylcyclohexanecarboxylate with ethylene glycol A mixture was prepared from 31.5 grams of 3,4-epoxy-6-methylcyclohexylmethyl 3,4-epoxy-6-methylcyclohexanecarboxylate and 3.5 grams of ethylene glycol in the proportion of 0.5 hydroxyl group per one epoxy group. To this mixture there was added 1.75 grams of boron trifluoride-piperidine complex catalyst which was a catalyst concentration (as boron trifluoride) of 2.4 weight percent based on the weight of diepoxide. The resulting mixture was heated to 120° C., poured into a bar mold and maintained at 120° C. for about one hour at 120° C. during which time a gel was formed. After a post cure of 6 hours at 160° C. there was obtained a resin with the following physical properties:

Heat distortion point, 264 p.s.i. _____ ° C __ 126
Izod impact, ft. lb./in. notch _____ 0.2
Barcol hardness _____ 48

15

*Example 25.—Reaction of 3,4-epoxy-6-methylcyclohexylmethyl 3,4-epoxy-6-methylcyclohexanecarboxylate with a polyethylene glycol with a molecular weight of 200*

A mixture was prepared from 25.8 grams of 3,4-epoxy-6-methylcyclohexylmethyl 3,4-epoxy-6-methylcyclohexanecarboxylate and 9.2 grams of a polyethylene glycol with an average molecular weight of 200. This mixture contained epoxide and diol in such proportions as to provide 0.5 hydroxyl group per one epoxide group. To this mixture there was added 1.75 grams of boron trifluoride-piperidine complex catalyst which was a catalyst concentration (as boron trifluoride) of 3.0 weight percent based on the weight of diepoxide. The resulting mixture was heated to 120° C., poured into a bar mold and maintained at 120° C. for about one hour during which time a gel was formed. After a post cure of 6 hours at 160° C. there was obtained a resin with the following physical properties:

Heat distortion point, 264 p.s.i. _____° C__ 46
Izod impact, ft. lb./in. notch _____ 0.5
Barcol hardness _____ 17

*Example 26.—Reaction of 3,4-epoxy-6-methylcyclohexylmethyl 3,4-epoxy-6-methylcyclohexanecarboxylate with 2,4,6-trimethylolphenyl allyl ether*

Mixtures were prepared from 3,4-epoxy-6-methylcyclohexylmethyl 3,4-epoxy-6-methylcyclohexanecarboxylate and 2,4,6-trimethylolphenyl allyl ether in the proportions indicated in Table XI. The mixtures were heated to 120° C. and maintained thereat for 60 hours and then for 14 hours at 160° C. The resulting amber, resinous products are described in Table XI.

TABLE XI

| Epoxide, grams | Triol, grams | Ratio of hydroxyl groups to epoxide groups | Description |
|---|---|---|---|
| 4.56 | 0.37 | 0.5 | soft. |
| 4.56 | 0.56 | 0.75 | hard. |
| 4.56 | 0.75 | 1.0 | hard. |
| 4.56 | 0.94 | 1.25 | hard. |
| 4.56 | 1.13 | 1.5 | hard. |

What is claimed is:

1. A curable composition comprising 3,4-epoxy-6-methylcyclohexylmethyl 3,4-epoxy-6-methylcyclohexanecarboxylate and resorcinol having from 0.2–1.5 hydroxyl groups per epoxy group of said epoxide.

2. A curable composition comprising (a) 3,4-epoxy-6-methylcyclohexylmethyl 3,4-epoxy-6-methylcyclohexanecarboxylate; (b) diphenylolpropane having $z$ hydroxyl groups per epoxy groups of said epoxide; and (c) maleic anhydride having $w$ carboxyl groups per epoxy group of said epoxide, wherein $w$ is a number up to 0.5; $z$ is a number in the range of from 0.2–1.5; the sum of $w$ plus $z$ is not greater than 1.5 and $w/z$ is less than 1.0.

3. A curable composition comprising (a) 3,4-epoxy-6-methylcyclohexylmethyl 3,4-epoxy-6-methylcyclohexanecarboxylate; (b) resorcinol having $z$ hydroxyl groups per epoxy group of said epoxide; and (c) phthalic anhydride having $w$ carboxyl groups per epoxy group of said epoxide, wherein $w$ is a number up to 0.5; $z$ is a number in the range of from 0.2–1.5; the sum of $w$ plus $z$ is not greater than 1.5 and $w/z$ is less than 1.0.

4. A curable composition comprising 3,4-epoxy-6-methylcyclohexylmethyl 3,4-epoxy-6-methylcyclohexanecarboxylate and glycerol having from 0.2–1.5 hydroxyl groups per epoxy group of said epoxide.

5. A curable composition comprising 3,4-epoxy-6-methylcyclohexylmethyl 3,4-epoxy-6-methylcyclohexanecarboxylate and ethylene glycol having from 0.2–1.5 hydroxyl groups per epoxy group of said epoxide.

6. Curable compositions comprising (a) epoxides characterized by the general formula:

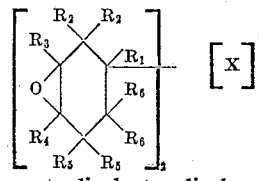

wherein X represents divalent radicals selected from the group consisting of

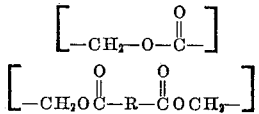

and

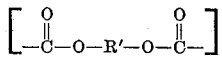

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent members selected from the group consisting of hydrogen and lower alkyl groups; (b) a polyol selected from the group consisting of polyhydric alcohols and polyhydric phenols having from 0.2–1.5 hydroxyl groups per epoxy group of said epoxide.

7. The cured compositions of claim 6.

8. Curable compositions comprising (a) epoxides characterized by the general formula:

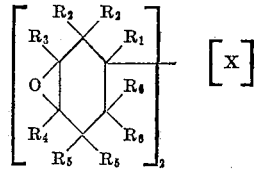

wherein X represents divalent radicals selected from the group consisting of

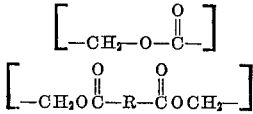

and

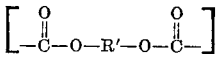

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent members selected from the group consisting of hydrogen and lower alkyl groups; (b) a polyol selected from the group consisting of polyhydric alcohols and polyhydric phenols having from 0.5–0.9 hydroxyl groups per epoxy group of said epoxide.

9. The cured composition of claim 8.

References Cited in the file of this patent

UNITED STATES PATENTS

| | | |
|---|---|---|
| 2,543,419 | Niederhauser | Feb. 27, 1951 |
| 2,602,785 | Wiles et al. | July 8, 1952 |
| 2,609,357 | Koroly | Sept. 2, 1952 |
| 2,716,123 | Frostick et al. | Aug. 23, 1955 |
| 2,720,500 | Cody | Oct. 11, 1955 |
| 2,750,395 | Phillips et al. | June 12, 1956 |

FOREIGN PATENTS

| | | |
|---|---|---|
| 530,335 | Canada | Sept. 11, 1956 |

UNITED STATES PATENT OFFICE
Certificate of Correction

Patent No. 2,890,195                                                                             June 9, 1959

Benjamin Phillips et al.

It is hereby certified that error appears in the printed specification of the above numbered patent requiring correction and that the said Letters Patent should read as corrected below.

Column 2, line 22, for "as directed" read —are directed—; column 4, line 42, for "group" read —groups—; column 5, line 22, for "alkyl hydroxyl," read —alkyl, hydroxyl,—; line 44, for "2-butine-1,4-" read — 2-butene-1,4- —; column 6, line 54, for "1,2-cyclohexanadi-" read — 1,2-cyclohexanedi- —; column 7, lines 53 to 59, the right-hand portion of the formula should appear as shown below instead of as in the patent:

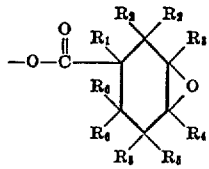

column 9, line 8, for "haide" read —halide—; column 10, line 64, Table IV, Footnote 1, for "2D" read —2%—; line 65, Footnote 2, for "10D" read —10%—; column 11, Table V, second column thereof, for the heading "Pololy" read —Polyol—; same table, sixth column thereof, in the heading, third line, for "Carbo-" read — Car- —; column 12, line 6, Table VI, under "Resin description" for "hard" read —Barcol, 32—; same table, line 7, for "Barcol, 32" read —hard—; column 13, line 65, for "perod" read —period—.

Signed and sealed this 26th day of July 1960.

[SEAL]

Attest:
KARL H. AXLINE,
*Attesting Officer.*

ROBERT C. WATSON,
                                           *Commissioner of Patents.*